United States Patent [19]
Kirkegaard

[11] 3,892,144
[45] July 1, 1975

[54] DRUM MOTOR
[76] Inventor: John Kirk Kirkegaard, Hoje Sandbjerg DK, Holte 2840, Denmark
[22] Filed: May 1, 1973
[21] Appl. No.: 356,181

[30] Foreign Application Priority Data
May 4, 1972 Denmark .......................... 2211/72

[52] U.S. Cl. .................................... 74/805; 74/391
[51] Int. Cl. ............................................. F16h 1/28
[58] Field of Search ............. 74/801, 804, 805, 391, 74/750 R; 259/81, 84, 3, 177 R

[56] References Cited
UNITED STATES PATENTS
1,313,537 8/1919 Jones ................................ 74/391 X
2,966,078 12/1960 Wright .............................. 74/805 X
FOREIGN PATENTS OR APPLICATIONS
534,270 3/1941 United Kingdom .................. 74/805

*Primary Examiner*—Benjamin W. Wyche
*Assistant Examiner*—Frank H. McKenzie, Jr.
*Attorney, Agent, or Firm*—Fleit & Jacobson

[57] ABSTRACT

A drum motor, preferably for driving a conveyor belt or similar transportation means, and provided between the motor armature and the rotating drum with a gear transmission system comprising two sets of planet gears at one end of the drum, which is supported by means of journals extending through the end covers of the drum and adapted to be mounted in an outer frame, the journal at the end of the drum opposite to the planet gear end being secured to a stator end cover and the planel wheels of the other planet gear set being in engagement with an internal toothing in the rotating drum, characterized in that the stator is connected to the annular wheel of the first planet gear set, and that the planet gear retaining member of the second planet gear set, which is rigidly connected to the journal at the planet gear end of the drum secured to said annular wheel.

4 Claims, 1 Drawing Figure

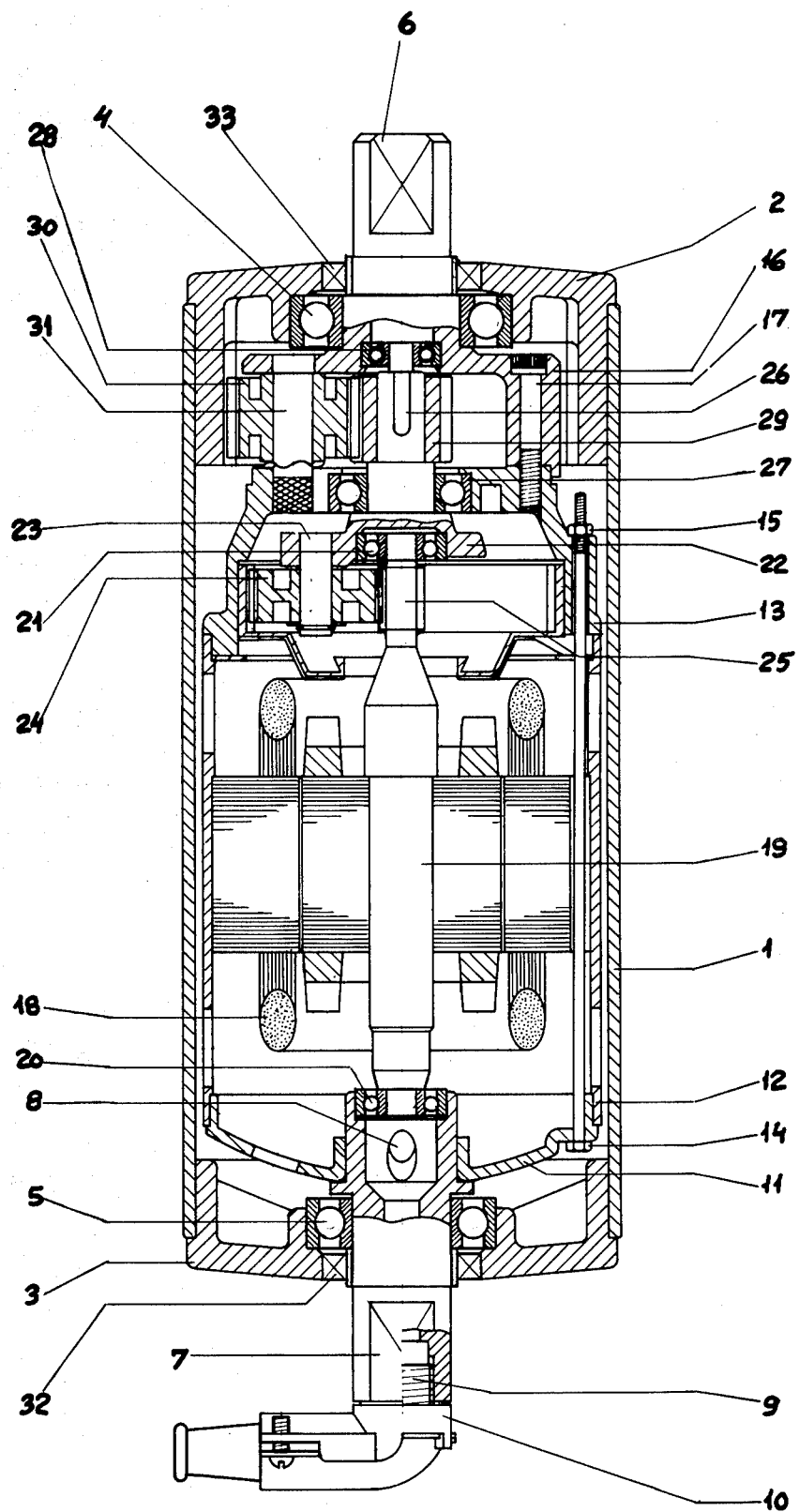

DRUM MOTOR

This invention relates to a drum motor, preferably for driving a conveyor belt or similar transportation means, and provided between the motor armature and the rotating drum with a gear transmission arrangement comprising two set of planet gears at one end of the drum, which is supported at both ends by means of journals extending through the end covers of the drum and adapted to be mounted in an outer frame, the journal at the end of the drum opposite the planet gear end being secured to a stator end cover and the planet wheels of the second planet gear set being in engagement with an internal toothing in the rotating drum.

It is the aim of the invention to provide a compact drum motor of the aforesaid type which, despite the required gear transmission, comprises relatively few members and therefore is cheap in production and which is very robust and capable of withstanding the transmission of a high torque between the motor armature and the rotating drum.

This aim has been accomplished according to the invention by connecting the stator to the annular wheel of the first planet gear set, to which is secured the planet gear retaining member of the second planet gear set, said retaining member being rigidly connected to the journal at the planet gear end of the drum.

The connection between the stator and the annular wheel of the first planet gear set may expediently be provided by means of throughgoing stay bolts which thus serve to effectively clamp three members together, namely the stator end cover, the stator shell and the annular gear wheel. Besides the said three members are secured to both of the journals extending through the end covers of the drum, the stator end cover being secured directly to the journal at the end opposite the planet gear end, and the journal at the planet gear end of the drum being rigidly connected to the planet gear retaining member of the second gear set, which in turn is secured to the annular wheel of the first planet gear set. Thus the reaction forces against the torque produced by the motor will be taken up by the outer frame at both ends of the drum motor, and the assembly of stationary parts within the rotating drum constitutes a very rigid unit. The drum motor taught by the invention is very compact and a great part of the available space within the drum may be occupied by the driving motor itself.

The invention will be explained here in greater detail and with reference to the drawing, which presents an axial longitudinal section of a drum motor according to the invention.

The drum motor illustrated in the drawing comprises an outer drum 1 which is circular cylindrical, but the surface of which may be slightly barrel-shaped with a view to the use of the motor for driving a conveyor belt or similar transportation means. The drum 1 has end covers 2 and 3 secured to the drum at either end and mounted by means of ball bearings, 4 and 5 respectively, on journals, 6 and 7 respectively, which are adapted to be supported in an outer frame which is not shown in the drawing. The journal 7 has an axial bore which at its inner end, inwardly of the end cover 3 communicates with the interior of the drum through an aperture 8. At its outer end the journal 7 is provided with an internal thread 9 adapted to connect a junction box 10 for wires (not shown here) which are introduced into the drum motor through the hollow journal 7 and the aperture 8. To the inner end of the journal 7 is secured a stator end cover 11 for the stator of an electromotor, preferably an asynchronous motor, whose stator shell 12, which extends inwardly of the drum 1 co-axial therewith, is mounted between the stator end cover 11 and an annular wheel 13 of a first planet gear set serving as gear transmission system. The stator end cover 11, the stator shell 12 and the annular wheel 13 are joined together by means of a plurality of throughgoing stay bolts 14, for instance five, extending in the axial direction from the stator end cover 11 immediately inwardly of the stator shell 12 and through the annular wheel 13 and provided on their projecting thread with their respective nuts 15 for clamping the members together.

The journal 6 is made integral with a planet gear retaining member 16 disposed inwardly of the end cover 2 for retaining a second set of planet gears serving as a further gear transmission system. The planet gear retaining member 16 is secured to the annular wheel 13 by means of three screws 17.

The stator windings are indicated at 18. The rotating members within the drum 1 comprise the armature 19 of the asynchronous motor, mounted at one end in a ball bearing 20 in the journal 7 and at the other end in a ball bearing 21 in the planet gear retaining member 22 of the first planet gear set. Three journals 23 in the planet gear retaining member 22 support rotatably their respective planet wheels 24 which are in engagement with a sun wheel 25 of the first planet gear set mounted on the shaft of the armature 19. The three planet wheels 24, moreover, are in engagement with the internal toothing of the stationary annular wheel 13. The rotation of the motor armature thus causes the planet gear retaining member 22 to rotate at a suitable transmission ratio. The planet gear retaining member 22 is made integral with a journal 26 mounted in a bearing 27 in the annular wheel 13. The journal 26 projects through the annular wheel 13 and is mounted rotatably by its free end in a bearing 28 at the bottom of the planet gear retaining member 16. Between the bearings 27 and 28 a sun wheel 29 of the second planet gear set is mounted on the journal 26. This sun wheel 29 is in engagement with three planet gear wheels 30 which run loosely on their respective journals 31. The journals 31 are secured to the planet gear retaining member 16 or to the annular wheel 13 or, preferably, to both. The planet gear wheels 30 are all in engagement with an internal toothing in the end cover 2. The planet gear retaining member 22 with the sun wheel 29 thus drives the planet wheels 30 on the non-rotatable planet gear retaining member 16, and the planet wheels 30 in turn drive the end cover 2 with the internal toothing and the drum 1 secured to the end cover 2.

Outwardly of the bearings 4 and 5 are provided sealing rings 33 and 32, respectively, so that the drum motor may contain a suitable quantity of oil for lubrication and cooling purposes.

What is claimed is:

1. A drum motor comprising a rotatable outer drum rotatably mounted on fixed axial journals at either end thereof, a fixed internal motor stator secured to said journals, a rotatable motor armature rotatably mounted on said journals, a first sun wheel secured to said armature, a first set of rotatable planet wheels meshing with said first sun wheel and with a fixed annular gear member secured to said stator, a carrier for said planet wheels rotatably mounted in a fixed member secured to said stator and having a second sun wheel secured thereto, a second set of planet wheels rotatably mounted on said fixed member and meshing with said second sun wheel and with an internal toothing on said drum.

2. A drum motor as recited in claim 1, and further comprising end covers on said outer drum through which said journals extend.

3. A drum motor as recited in claim 2, wherein the interior of said drum is filled with an oil.

4. A drum motor as recited in claim 1, wherein one of said journals is provided with an axially extending passage through which electricity supply leads for said motor may pass.

* * * * *